Jan. 7, 1936.  P. L. GEER  2,026,781
VERTICAL GLASS ANNEALING LEER
Filed March 1, 1932  2 Sheets-Sheet 1
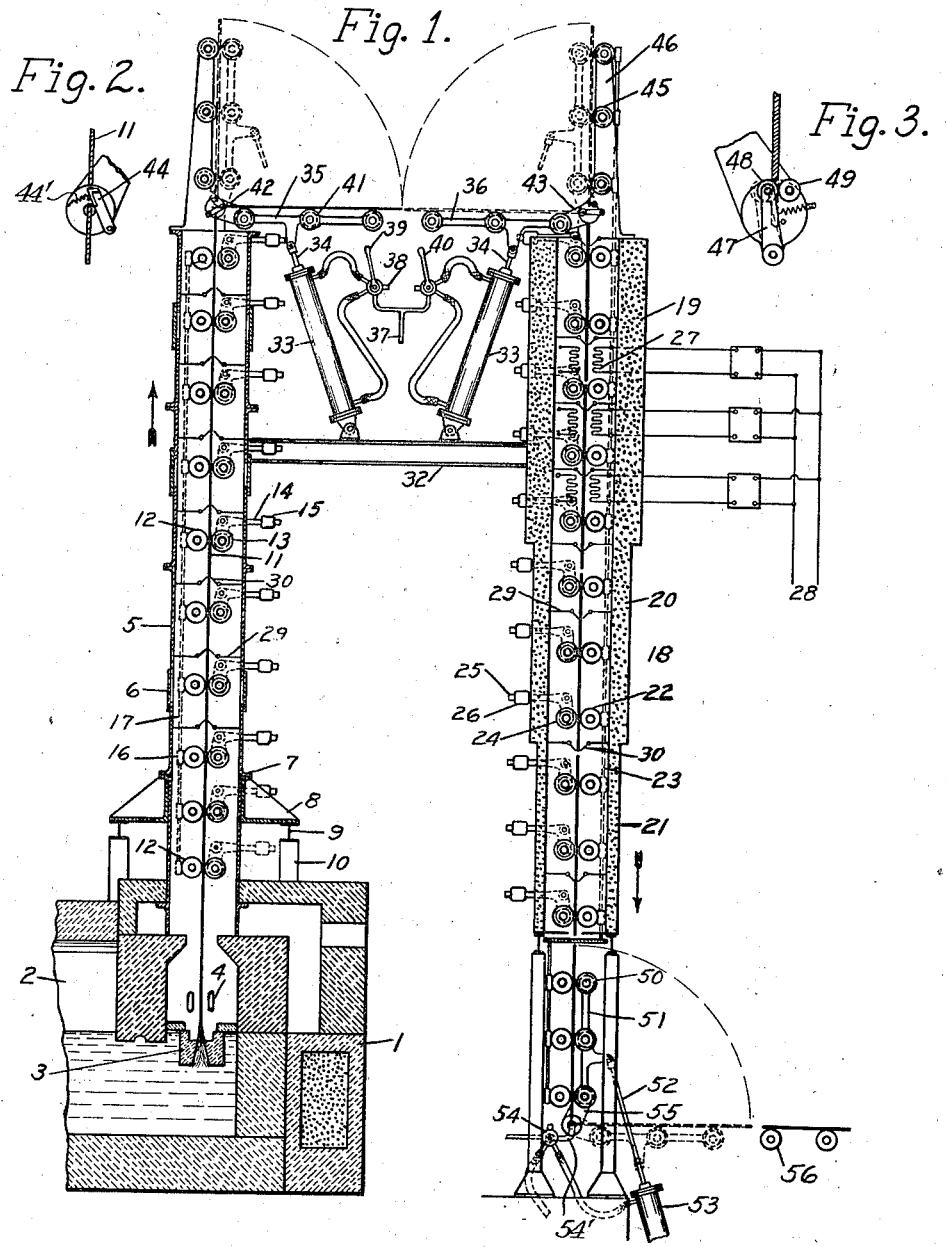
INVENTOR
Paul L. Geer
by William B. Jaspert
ATTORNEY

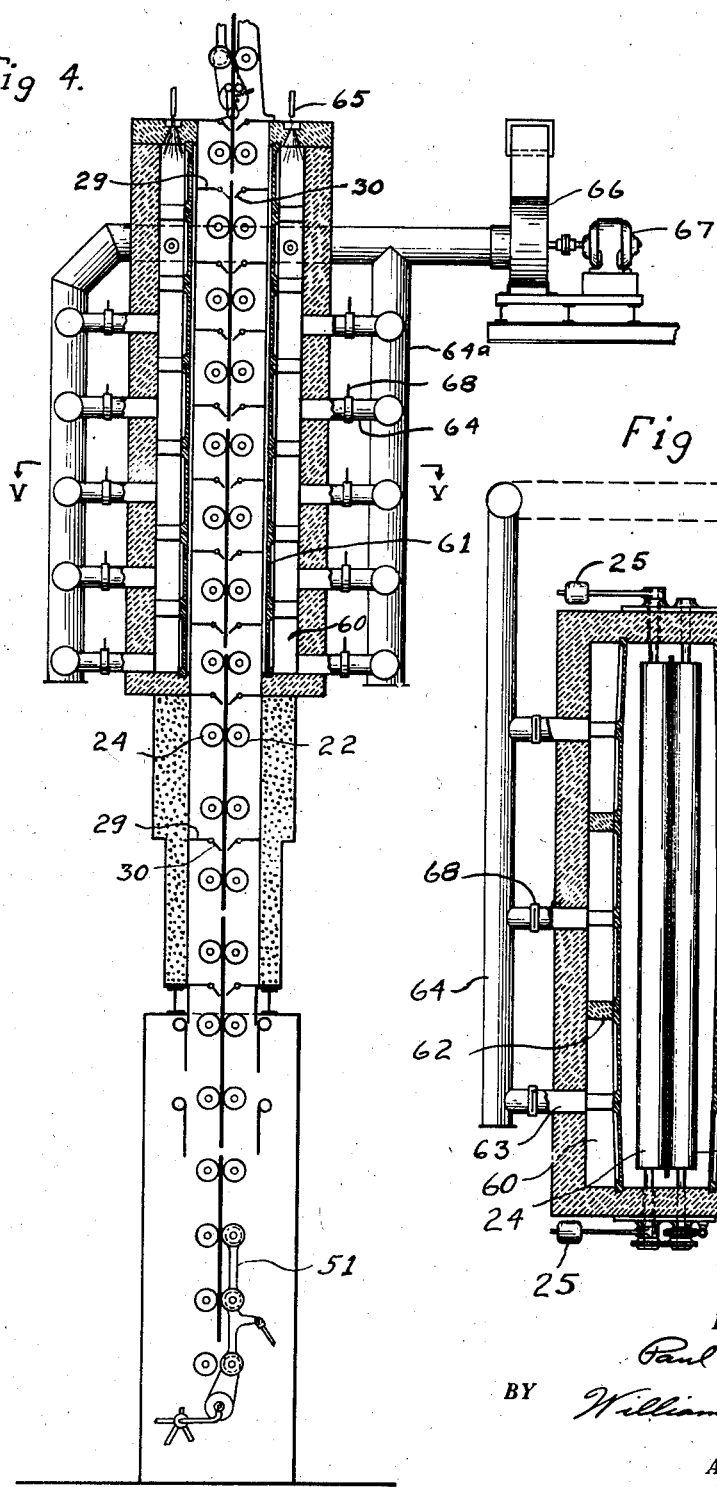

UNITED STATES PATENT OFFICE 2,026,781

VERTICAL GLASS ANNEALING LEER

Paul L. Geer, Pittsburgh, Pa., assignor to Amco, Incorporated, Pittsburgh, Pa., a corporation of Pennsylvania Application March 1, 1932, Serial No. 596,071

6 Claims. (Cl. 49—47)

This invention relates to apparatus for vertically drawing sheet glass and more particularly to apparatus for handling, trimming and annealing sheet glass after it is drawn from the working chamber of the glass melting tank.

It is among the objects of the invention to provide apparatus for handling the drawn glass in a manner to render it readily accessible to the operator for trimming the bulbous edges and for transferring the glass in sheets to a vertical annealing leer wherein it is subjected to suitable annealing temperatures and which shall be provided with means for automatically transferring the plate glass from the conveying means of the vertical leer to a horizontal conveyor mechanism.

The invention will become more apparent from a consideration of the accompanying drawings in which like reference characters designate like parts and in which:

Figure 1 is a vertical sectional view of a portion of a glass melting tank, drawing apparatus, transfer mechanism, and glass annealing leer embodying the principles of this invention;

Figure 2 a sectional elevational view of a portion of a glass sheet supporting and transferring means;

Figure 3 a sectional elevation of a portion of a pinch roll mechanism employed for yieldingly supporting the cut off sheets of glass prior to their entry into the glass annealing leer.

Figure 4 a vertical cross sectional view partially in elevation of a vertical glass annealing leer of the fuel barge type; and, Figure 5 a longitudinal sectional elevational view taken along the line V—V of Figure 4.

With reference to the figures of the drawings, 1 generally designates a glass melting tank in which the chamber 2 contains the refined glass which is maintained at suitable drawing temperature and at a substantially uniform level. Within the chamber is provided a debiteuse block 3 having a long slot with rounded ends through which the glass is drawn to form a sheet having bulbous edges. Cooling blocks 4 are provided adjacent the debiteuse block to initially set the sheet glass as it passes upwardly into the drawing mechanism which is contained in a sectional housing 5 forming a closure to prevent unequal cooling of the glass passing therethrough. The housing 5 may be provided with doors 6 and is supported by flanges 7 on a base 8 which in turn is supported on I-beams 9 resting on blocks 10 on the crown of the melting tank.

The sheet glass which is shown as a continuous strip 11 is drawn from the glass pool through the debiteuse block by means of a series of positively driven rollers 12 which cooperate with idle rollers 13, the latter being mounted on bell crank levers 14 having a stationary or adjustable weight 15 to supply suitable pressure for intimate contact of the glass between rollers 12 and 13.

Rollers 12 are driven by gear teeth connections with worms 16 mounted on a common vertical spindle 17 constituting a drive shaft which is actuated by a motor or other suitable drive connection (not shown).

A glass annealing leer generally designated at 18 is provided for annealing the sheet glass and consists of a wall structure having different thicknesses of insulating material as designated at 19, 20 and 21, the heavy section 19 forming the annealing chamber constituting the critical annealing range of the glass and the insulating walls 20 and 21 of decreasing sections form the annealing chamber wherein the glass is subjected to reduced temperatures. As in the drawing mechanism, the sheet glass is conveyed through the vertical chamber by means of rollers 22 driven by the worm shaft 23 and idle rollers 24 mounted on bell crank levers 25 and counterweighted at 26 to produce suitable contact of the glass with the conveying means.

Any suitable heating medium may be utilized for annealing the glass but on account of the stack-like construction of the vertical leer it may be desirable to employ electrical heating, particularly in the critical annealing zone of the leer to obtain suitable temperature control. For this purpose, electrical resistor elements 27 are provided on both sides of the sheet glass, the resistor being connected to a suitable power circuit generally designated at 28.

Both the drawing and annealing towers of the apparatus are provided with partition members 29 at spaced intervals having hinged members 30 which rest against the sheet glass, thus dividing the towers into a series of separate contiguous chambers to prevent setting up detrimental circulating air currents. In the drawing tower the hinge members are adapted to hinge in the direction of movement of the glass sheet which is vertically upward as indicated by the arrow and in the annealing tower the members 30 are hinged downwardly since the sheet glass travels downward, as shown by the arrow. At the top between the drawing and annealing towers is provided a transverse support 32 on which is mounted a pair of fluid pressure actuating mechanisms consisting of cylinders 33 having operating pistons 34 pivotally connected to transfer arms 35 and 36.

The cylinders are connected to a source of fluid pressure through the T-connection 37 and to the atmosphere at 38. Valves 39 and 40 control the pressure and exhaust connections to the cylinders. The transfer arms 35 and 36 are provided with rollers 41 and are further connected by a link 42 and 43 at one about which the transfer arms are fulcrumed.

When the piston elements of the fluid pressure actuating members are extended by pressure in the cylinders 33, the transfer arms 35 and 36 are moved angularly through the arc designated by the dotted lines, bringing the arms 35 and 36 in a vertical position from the horizontal. By so operating the arm 35, it is brought to the position shown by dotted lines with the rollers 41 contacting the glass sheet 11 as it passes out of the drawing tower.

The operator will cut off the glass and remove the bulbous edges and the cut-off sheet is placed upon a spring biased finger 44 carried on the end of transfer arm 35 as shown in Figure 2 the finger being normally pressed against the glass by a spring 44'. By releasing the pressure in cylinder 33 through manipulation of valve 39, the cut off portion of the glass sheet will be lowered to a horizontal position by movement of the transfer arm 35. While in this position, the operator trims off the bulbous edges of the glass and transfers the sheet to the arm 36 by means of which, through manipulation of valve 40, it is raised to the vertical position shown by the dotted line structure.

As shown in the drawings, a series of rollers 45 are provided on an extending portion 46 of the conveyor structure and these rollers are positively driven to rotate by the worm drive shaft 23. When transfer arm 36 brings the cut off and trimmed sheet glass into contact with the rollers 45, it will come to rest on the spring biased lever 47 having a roller 48 which cooperates with a fixed roller 49. Rotation of the conveyor rollers 45 starts the cut off sheet through the rollers 48 and conveys it downwardly into the annealing chamber.

As the glass passes through the gradually decreasing temperature zones of the annealing tower, all strains are removed and it is delivered in a properly annealed state to the bottom of the tower where it is engaged by rollers 50 of a transfer arm 51. The arm 51 is actuated by a piston 52 disposed in an operating cylinder 53 adapted to be connected to a source of pressure through a valve 54. The valve is provided with an arm 54' disposed in the path of the glass sheet which is displaced to release pressure in the cylinder 53 by the edge of the glass sheet in its downward travel. When the pressure is released, arm 51 is lowered to the horizontal position shown in dotted construction and the glass is transferred to conveyor rollers 56 by means of which it is removed to a loading zone.

In Figures 4 and 5 of the drawings, the annealing chamber is provided with a double wall having a space in between which constitutes heating flues 60 which are separated from the annealing chamber proper by a wall 61. As shown in Figure 5 the heating flue 60 may be divided by partition member 62 to constitute separate flue channels each of which has conduits 63 connected to a manifold structure 64 which is joined to the main flues 64a through which the products of combustion from burners 65 are drawn by a blower 66. The blower is operated by the motor 67 and by manipulating a series of dampers 68, the products of combustion from the burner 65 may be drawn off at any point between the burner 65 and the bottom conduits 63. By manipulating the dampers, a definite and variable temperature gradient may be established in the annealing compartments through which the glass passes, and on account of the partition member 62, the temperature may likewise be controlled transversely of the sheet glass thereby obtaining great flexibility of temperature control for proper annealing of the glass as it passes downwardly to the transfer arm 51.

The operation of the apparatus is briefly as follows: Glass is drawn from the pool into the drawing tower and conveyed to the top of the tower where the operator cuts off sheets of given size and lowers it to the horizontal position by means of the transfer arm 35. He then trims off the bulbous edges and the cut-off sheet of substantially uniform thickness is transferred by the operator to the arm 36 which raises it vertically above the annealing tower wherein it is conveyed downwardly and subjected to suitable annealing temperatures. After it passes from the annealing tower, it is engaged by the transfer mechanism 51 and transferred to the horizontal conveyor.

By means of the herein described apparatus, the sheet glass is drawn, trimmed and annealed without handling by the operator and a product of uniform quality is thereby assured.

By trimming the bulbous edges of the sheets prior to annealing, they are subjected to uniform heat treatment since the glass passing into the annealing chamber is of uniform thickness throughout. Where the glass is trimmed after annealing, detrimental strains are set up due to the uneven heating of the heavy edge sections and the thinner mid sections and the invention has among its primary objects the provision of means whereby the trimming of the glass sheets may be facilitated without interrupting the continuous operation of drawing and annealing.

Although one embodiment of the invention has been herein described and illustrated, it will be obvious to those skilled in the art that various modifications may be made in the details of construction without departing from the principles herein set forth.

I claim:

1. A vertical tunnel apparatus for annealing sheet glass comprising an enveloping wall structure forming a vertical heating chamber, a series of conveying elements within said chamber adapted to engage sheet glass and lower it from the top to the bottom of said chamber, a transfer arm at the top of said chamber adapted in a horizontal position to receive sheet glass to be annealed, and means for actuating said arm to raise it to the vertical position to hold the glass in cooperative alinement with the conveying elements of said annealing apparatus.

2. A vertical tunnel apparatus for annealing sheet glass comprising an enveloping wall structure forming a vertical heating chamber, conveyor elements disposed in said chamber for conveying sheet glass downwardly from the top to the bottom of said chamber, a transfer arm associated with said conveying mechanism at the top of said heating chamber, means for moving said arm from a horizontal to a vertical position, a second transfer arm at the bottom of said heating chamber, and means for moving said arm from the vertical to the horizontal position.

3. In combination in a vertical leer for annealing sheet glass continuously, a vertical chamber, a plurality of superposed drive rolls operating inside the chamber, a plurality of superposed pressure rollers adjacent the drive rollers, driving means for the said rollers, an open portable hinged extension of the chamber, rollers carried by the said extension into vertical alinement with the rollers in the chamber and for swinging the rollers angularly thereto.

4. A vertical tower and tunnel apparatus adapted to receive, anneal and discharge sheet glass, a swinging sheet glass receiving platform at a side adjacent the top of the tower, idler rolls for supporting the glass on said platform, fixed driven rolls opposite the said idler rolls for moving the glass toward the tunnel, rollers for moving the glass along the central axis of and through the tunnel, a swinging glass discharge platform at the bottom of said tower adapted to deliver the glass in a horizontal position at the opposite side from the receiving side, idler rolls on the said glass discharge platform, driven rolls opposite the idler rolls for moving the glass on the platform and means for swinging the platform to remove the glass intermittently from the platform.

5. A vertical tunnel apparatus for annealing sheet glass comprising an enveloping wall structure forming a closure for a heated chamber, conveyor elements disposed in said chamber for conveying glass from the bottom to the top of said chamber, a transfer arm associated with said conveying mechanism at the top of the chamber, means for moving said arm from a vertical to a horizontal position and means associated with said arm for supporting the lower end of the sheet during the movement of the arm from the vertical to the horizontal position.

6. In an organized sheet glass forming and annealing apparatus, the combination which comprises a source of molten glass, a sheet glass drawing machine, an annealing leer adapted to cooperate with the sheet glass machine at the discharge level of said machine, means for causing such cooperation and transferring the glass from the forming machine to the annealing machine at a higher elevation than the source of the glass, passing the glass through a heat controlled annealing range in the leer and returning it to substantially the level of the glass source.

PAUL L. GEER.